(12) United States Patent
Hirayama

(10) Patent No.: US 10,244,126 B2
(45) Date of Patent: Mar. 26, 2019

(54) MTF MEASURING METHOD FOR MEASURING MTF OF CONTACT IMAGE SENSORS, AND MTF ADJUSTING METHOD

(71) Applicant: KYOCERA Document Solutions Inc., Osaka (JP)

(72) Inventor: Hayato Hirayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/924,055

(22) Filed: Mar. 16, 2018

(65) Prior Publication Data
US 2018/0270364 A1    Sep. 20, 2018

(30) Foreign Application Priority Data
Mar. 16, 2017 (JP) .................. 2017-050847

(51) Int. Cl.
  *H04N 1/04* (2006.01)
  *H04N 1/00* (2006.01)
  *H04N 1/407* (2006.01)

(52) U.S. Cl.
  CPC ..... *H04N 1/00045* (2013.01); *H04N 1/00005* (2013.01); *H04N 1/00013* (2013.01); *H04N 1/4072* (2013.01)

(58) Field of Classification Search
  None
  See application file for complete search history.

(56) References Cited

U.S. PATENT DOCUMENTS

| 5,164,580 | A  | * | 11/1992 | Funada  | H01L 31/12 250/208.1 |
| 6,344,916 | B1 | * | 2/2002  | Chiu    | G01B 11/026 355/55 |
| 6,493,075 | B1 | * | 12/2002 | Huang   | G02B 7/38 355/55 |
| 9,686,422 | B2 | * | 6/2017  | Narai   | H04N 1/0249 |
| 2008/0180761 | A1 | * | 7/2008  | Sato    | H04N 1/00795 358/497 |
| 2008/0198426 | A1 | * | 8/2008  | Yokochi | H04N 1/00013 358/486 |

FOREIGN PATENT DOCUMENTS

JP     2001-063141 A     3/2001

* cited by examiner

*Primary Examiner* — Dung D Tran
(74) *Attorney, Agent, or Firm* — Hawaii Patent Services; Nathaniel K. Fedde; Kenton N. Fedde

(57) ABSTRACT

Provided is a MTF measuring method that is capable of estimating an accurate MTF curve in one measurement. The method is a MTF measuring method for measuring the MTF of a CIS that includes a CMOS sensor, and a lens that directs incident reflected light from a document via a contact glass to the CMOS sensor. A test chart is placed on the contact glass via a transparent plate having a thickness that varies at different locations in the sub scanning direction. Then, the CIS is caused to scan in the sub scanning direction, and in one scan, is caused to measure respective MTF at multiple measurement locations where the thickness of the transparent plate differs.

3 Claims, 8 Drawing Sheets

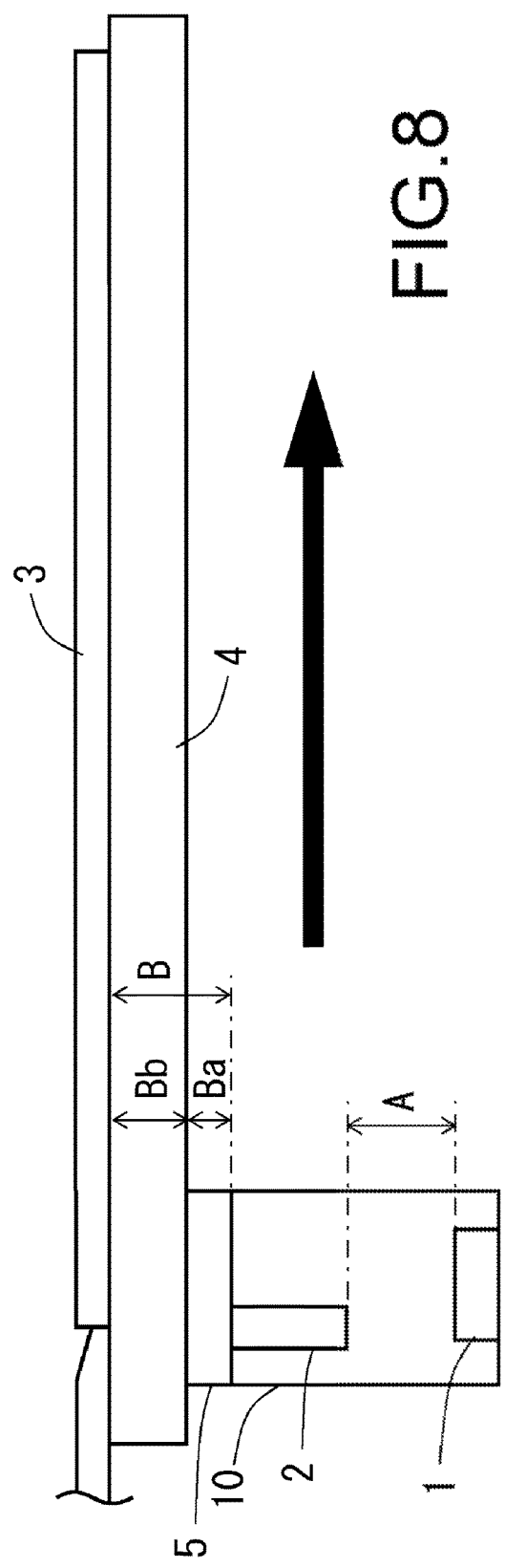

MTF MEASURING METHOD FOR MEASURING MTF OF CONTACT IMAGE SENSORS, AND MTF ADJUSTING METHOD

INCORPORATION BY REFERENCE

This application is based on and claims the benefit of priority from Japanese Patent Application No. 2017-050847 filed on Mar. 16, 2017, the contents of which are hereby incorporated by reference.

BACKGROUND

The present disclosure relates to a MTF measuring method for measuring MTF of a contact image sensor (CIS), and to a MTF adjusting method.

In recent years, CISs are often used in image reading apparatuses that are used in low-cost MFPs (Multi-Function Peripherals) or scanners. A CIS is an image reading sensor that includes a light source such as an LED or the like that irradiates light onto a document, multiple photoelectric conversion elements that are arranged in the main scanning direction of a CMOS sensor or the like (hereafter, referred to as a CMOS sensor), and a lens for directing light reflected from a document to the CMOS sensor. In addition, a CIS is mounted in a reading unit that moves back-and-forth in the sub scanning direction over the rear surface of a contact glass where a document is placed. As the reading unit moves, the CIS irradiates light toward the document, and receives incident reflected light from the document via the contact glass. In this way, the reading unit reads an image of the document.

SUMMARY

The MTF measuring method according to the present disclosure is a MTF measuring method for measuring MTF of a contact image sensor that includes multiple photoelectric conversion elements that are arranged in the main scanning direction, and a lens that directs incident reflected light from a document via a contact glass to the photoelectric conversion elements. A test chart is placed on the contact glass via a transparent plate having a thickness that varies at different locations in the sub scanning direction. Then, the contact image sensor is caused to scan in the sub scanning direction, and in one scan, is caused to measure respective MTFs at multiple measurement locations where the thickness of the transparent plate differs.

BRIEF DESCRIPTION OF THE DRAWINGS

FIG. 8 is a schematic side view for explaining an example of a MTF measuring method.

DETAILED DESCRIPTION

In the following, embodiments according to the present disclosure will be explained in detail with reference to the drawings. In the following embodiments, the same reference numbers will be given to configuration having a similar function.

First Embodiment

Figure 1:
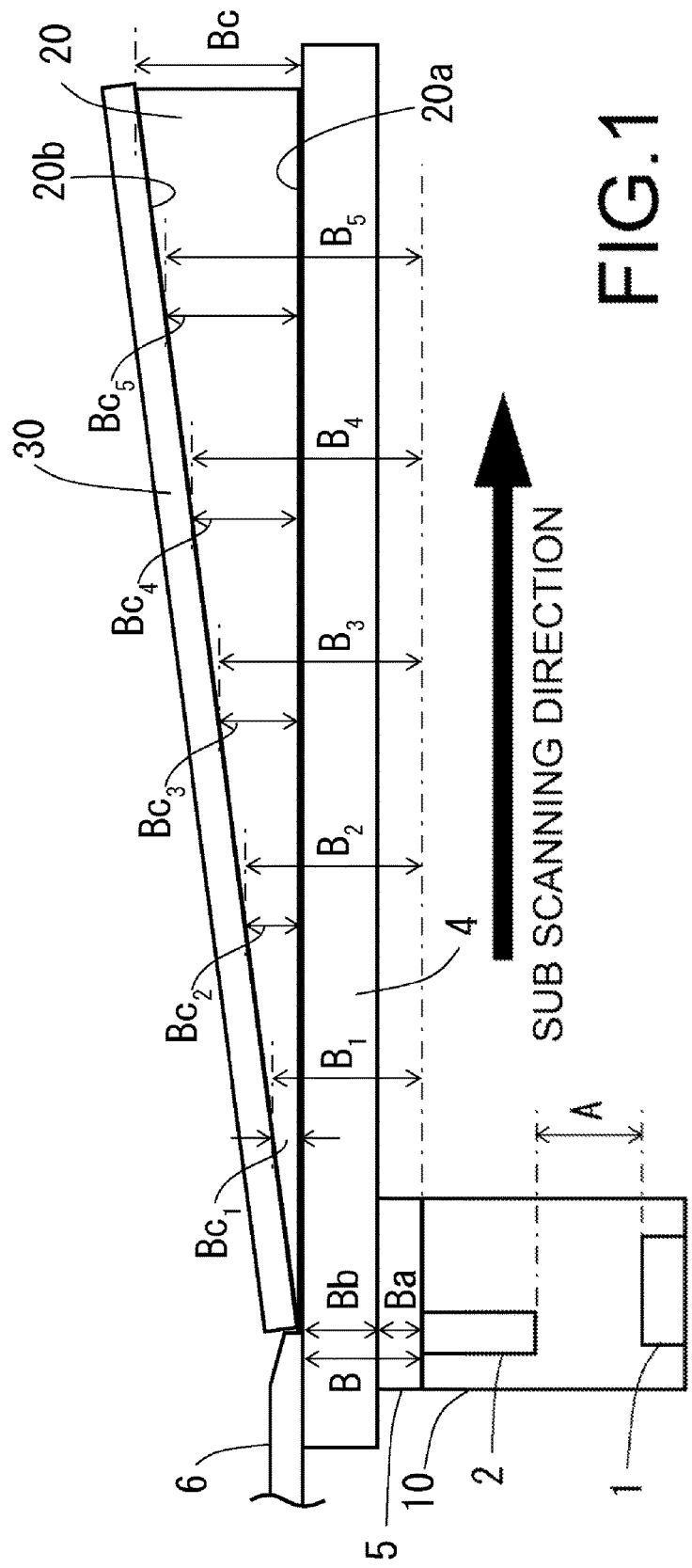
FIG. 1 is a schematic side view for explaining a first embodiment of a MTF measuring method according to the present disclosure.

As illustrated in FIG. 1, in in a first embodiment of a MFT measuring method, a transparent plate 20 that is glass or the like is placed on a contact glass 4 as an inspection jig. The transparent plate 20 has as a first surface, a flat placement surface 20a, and has as a second surface, an opposing surface 20b that faces the placement surface 20a and that is inclined at a specified angle.

The transparent plate 20 is brought into contact with a positioning member 6 in the sub scanning direction. The placement surface 20a of the transparent plate 20 is placed on the contact glass 4 so that the thickness Bc does not change in the main scanning direction, and gradually decreases or gradually increases in the sub scanning direction. The thickness Bc is the distance between the placement surface 20a and the opposing surface 20b. In addition, in the example illustrated in FIG. 1, the cross section of the transparent plate 20 as viewed in the main scanning direction is configured as a triangle in which the thickness Bc gradually increases from 0, however, may also be configured as a trapezoid in which the thickness Bc gradually increases from a specified length.

Figure 2:
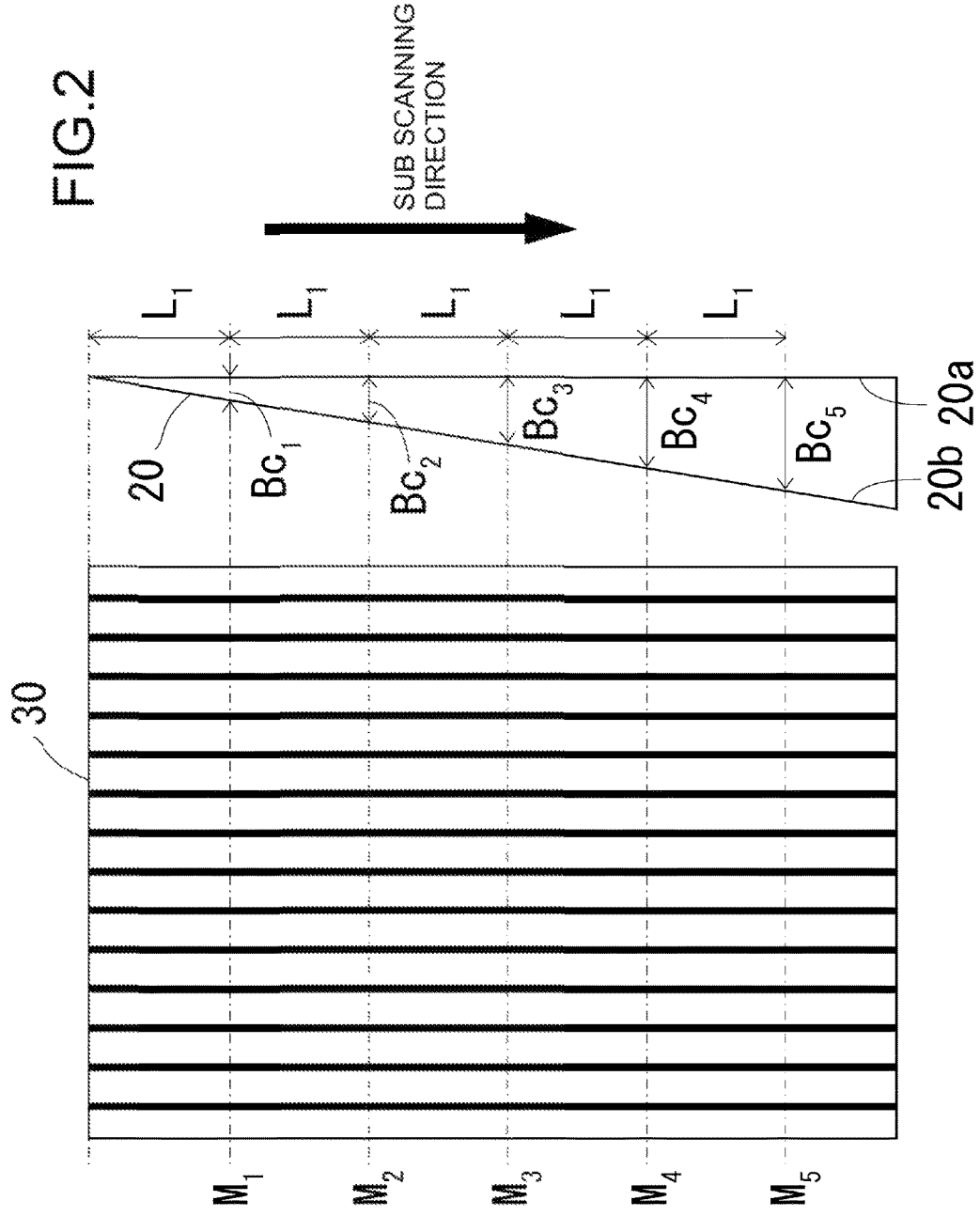
FIG. 2 is a diagram illustrating the configuration of the test chart illustrated in FIG. 1.

Next, a test chart 30 such as illustrated in FIG. 2 is placed on the transparent plate 20. The resulting distance B between the lens 2 and the test chart 30 (document) with respect to the distance A between the CMOS sensor 1 and the lens 2 will be explained. The distance B is the value obtained by adding the thickness Ba of a positioning spacer 5 that positions the space between the lens 2 and the contact glass 4, the thickness Bb of the contact glass 4, and the thickness Bc of the transparent place 20. Moreover, the thickness Bc of the transparent plate 20 varies in the sub scanning direction such as from thickness $Bc_1$ to thickness $Bc_5$, so the distance B between the lens 2 and the test chart 30 (document) also changes in the sub scanning direction such as from $B_1$ to $B_5$.

Figure 3:
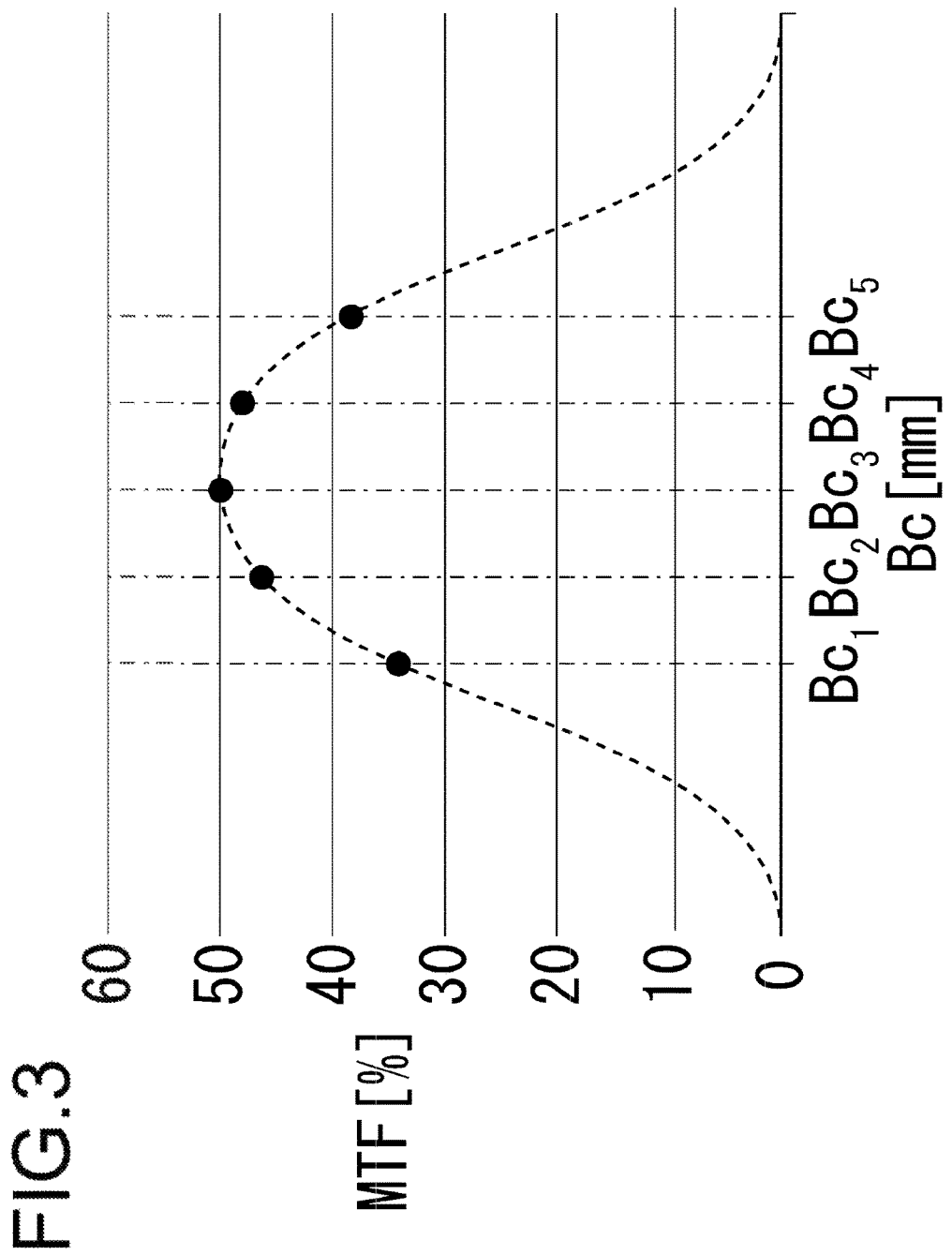
FIG. 3 is a diagram illustrating an example of MTF measurement results by the MTF measuring method according to the present disclosure.

Next, scanning is performed in the sub scanning direction illustrated by the direction of the arrow in FIG. 1, and in one scan, respective MTFs are measured at different locations in the sub scanning direction. When MTFs are measured at different measurement locations in the sub scanning direction, for example, at measurement locations $M_1$ to $M_5$ for each specified distance $L_1$ illustrated in FIG. 2, the angle between the placement surface 20a and the opposing surface 20b of the transparent plate 20 is known. Therefore, thickness $Bc_1$ to thickness $Bc_5$ of the transparent plate 20 at the measurement locations $M_1$ to $M_5$ are known. Accordingly, as illustrated in FIG. 3, the measurement results at the measurement locations $M_1$ to $M_5$ become as plotted on an imaginary MTF curve in which the horizontal axis is taken to be the thickness Bc of the transparent plate 20.

Therefore, of the measurement locations $M_1$ to $M_5$, the measurement location where the MTF measurement result is the highest is identified. In the example illustrated in FIG. 3, the measurement location $M_3$ is identified. Then, the thickness obtained by adding the thickness $Bc_3$ of the transparent plate 20 at the identified measurement location $M_3$ and the thickness Ba of the spacer 5 that is mounted at the time of measurement ($Bc_3$+Ba) is set as the thickness of the spacer 5. In this case, the MTF of the document reading apparatus in which the CIS 10 is mounted becomes the actual measurement value at the identified measurement location $M_3$. Therefore, the most satisfactory measurement result can be selected from among a plurality of measurement results, and the selected measurement result can be incorporated into the document reading apparatus as the actual performance. In addition, it goes without saying that the more measurement locations there are, the more accurate of a MTF curve can be measured.

Moreover, when the minimum value of the assumed distance A between the CMOS sensor 1 and the lens 2 is taken to be $A_{min}$, the thickness Ba of the spacer 5 that is mounted at the time of measurement may be less than the value obtained by subtracting the thickness Bb of the contact glass 4 from the minimum value $A_{min}$ ($A_{min}$–Bb). As a result, the measurement location is set from the front side of the MTF peak going toward the peak.

Moreover, the maximum thickness $Bc_{max}$ of the transparent plate 20 at the measurement locations $M_{1i}$ to $M_5$ will be explained. When the maximum value of the assumed distance A between the CMOS sensor 1 and the lens 2 is taken to be $A_{max}$, the thickness $Bc_{max}$ may be greater than the value obtained by subtracting the thickness Ba of the spacer 5 that is mounted at the time of measurement and the thickness Bb of the contact glass 4 from the maximum value $A_{max}$ ($A_{max}$–Ba–Bb). As a result, a measurement location that is beyond the MTF peak is set.

Furthermore, a test chart 30 that is attached to the transparent plate 20 may be used as an inspection jig.

Second Embodiment

Figure 4:
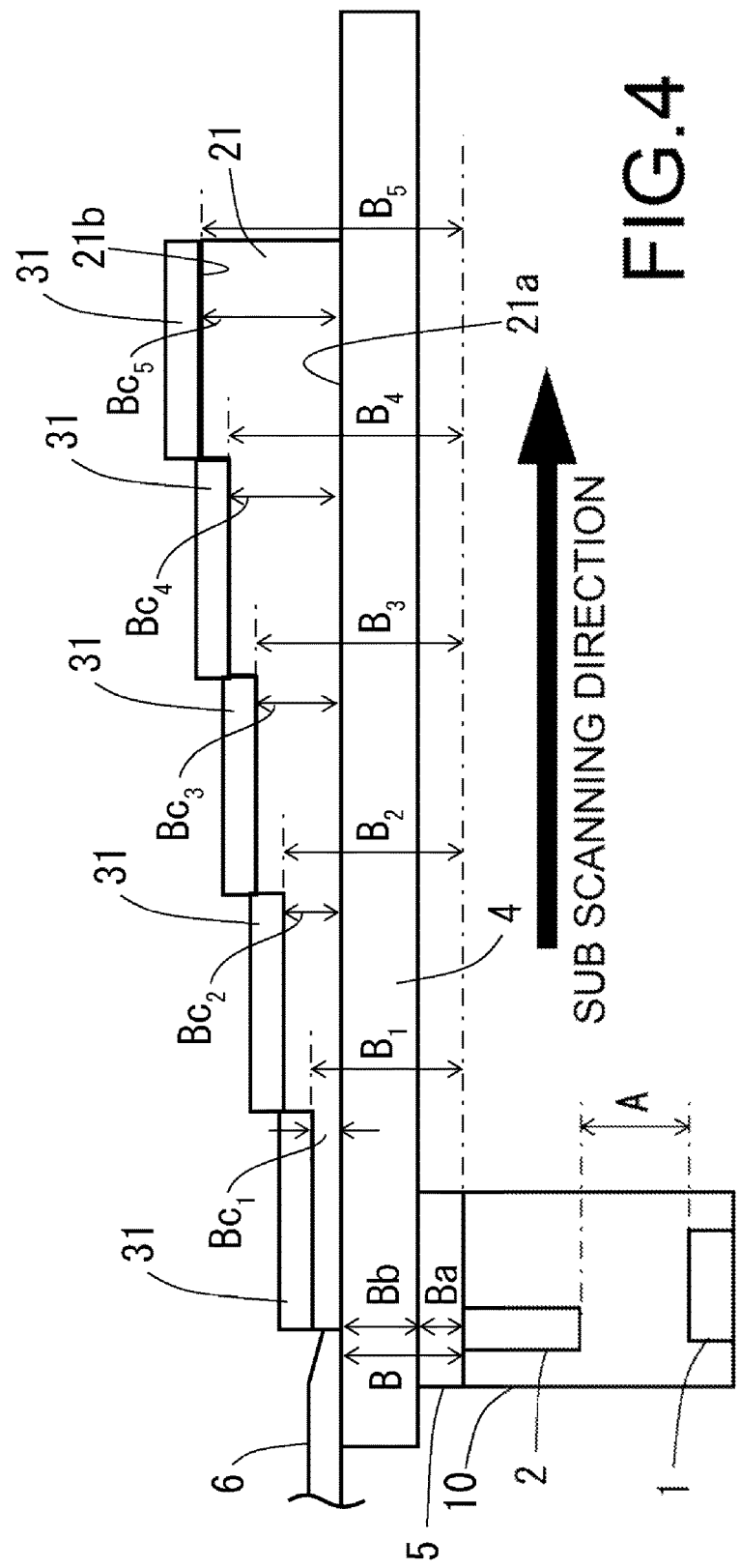
FIG. 4 is a schematic side view for explaining a second embodiment of a MTF measuring method according to the present disclosure.

In a second embodiment of a MTF measurement method, as illustrated in FIG. 4, a transparent plate 21, having a placement surface 21a as a flat first surface and opposing surfaces 21b as second surfaces such that the thickness Bc between the first and second surfaces gradually decreases or gradually increases in a stepwise manner in the sub scanning direction, is placed on the contact glass 4. In this embodiment, as illustrated in FIG. 4, "in a stepwise manner" is such that the thickness Bc changes in steps in the order thickness $Bc_1$, thickness $Bc_2$, thickness $Bc_3$, thickness $Bc_4$ and thickness $Bc_5$. Then, test charts 31 that are short in the sub scanning direction are placed on each of the opposing surfaces 21b of the transparent plate 21 having different thicknesses Bc.

In this second embodiment, the number of measurement locations M is limited, however, this second embodiment differs from the first embodiment in that the test charts 31 can be placed parallel with the contact glass 4. Therefore, MTF measurement can be performed under the same conditions as when reading a document.

In addition, a transparent plate 21 that is divided into each thickness Bc may be used.

As explained above, the MTF measurement method according to this embodiment is a MTF measurement method for measuring the MTF of a CIS 10 that includes a CMOS sensor 1 and a lens 2 that directs incident reflected light from a document via the contact glass 4 to the CMOS sensor 1; and in this method a test chart 30, 31 is placed on the contact glass 4 via a transparent plate 20, 21 having a thickness Bc that changes at different locations in the sub scanning direction, the CIS 10 scans in the sub scanning direction, and in one scan, measures the respective MTFs at a plurality of measurement locations M where the thickness Bc of the transparent plate 20, 21 differs.

With this configuration, MTFs at multiple depths can be measured in one measurement, so an accurate MTF curve can be easily estimated.

Furthermore, in this embodiment, the transparent plate 20 has a placement surface 20a as a flat first surface and an opposing surface 20b as a second surface that faces the placement surface 20a and is inclined at a specified angle, and the placement surface 20a is placed on the contact glass 4 so that the thickness Bc of the transparent plate 20 does not change in the main scanning direction and gradually decreases or gradually increases in the sub scanning direction.

With this kind of configuration, measurement locations M having different focal depths can be easily set. Moreover, by simply changing the position in the sub scanning direction, the number of measurement locations M and the focal depths can be changed.

Furthermore, in this embodiment, configuration is such that the space between the lens 2 and the contact glass 4 can be adjusted by the thickness Ba of the spacer 5, and the thickness Ba of the spacer 5 that is mounted at the time of measurement is set to be less than a value that is obtained by subtracting the thickness Bb of the contact glass 4 from the minimum value $A_{min}$ of the assumed distance A between the CMOS sensor 1 and the lens 2 ($A_{min}$–Bb).

With this configuration, a measurement location can be set from the front side of the MTF peak toward the peak.

Furthermore, in this embodiment, the maximum thickness $Bc_{max}$ of the thickness Bc of the transparent plate 20 at the measurement locations $M_1$ to $M_5$ is set to be larger than a value that is obtained by subtracting the thickness Ba of the spacer 5 that is mounted at the time of measurement and the thickness Bb of the contact glass 4 from the maximum value $A_{max}$ of the assumed distance A between the CMOS sensor 1 and the lens 2 ($A_{max}$–Ba–Bb).

With this configuration, a measurement location can be set beyond the MTF peak.

Moreover, in this embodiment, the highest MTF measurement result is identified from measurement results at a plurality of measurement locations $M_1$ to $M_5$, and the value that is obtained by adding the thickness $Bc_3$ of the transparent plate 20 at the identified measurement location $M_3$ and the thickness Ba of the spacer 5 that is mounted at the time of measurement ($Bc_3$+Ba) is set as the thickness of the spacer 5 that is mounted in the document reading apparatus.

With this configuration, the measurement result with the most suitable focus is selected from among a plurality of measurement results, and the selected measurement result can be incorporated into the document reading apparatus as the actual performance.

In the document reading function there is performance called the MTF (Modulation Transfer Function) that is related to the focal depth and focus. Moreover, a characteristic of a CIS is that, when compared with a CCD (Charge Coupled Device), the focus tends to fluctuate easily with respect to the fluctuation of the focal length. The higher the MTF is, the better the focus becomes, and the lower the MTF is, the more the focus becomes blurred. In referring to FIG. 5, in the case of a CCD, the MTF value changes smoothly with respect to change in the focal length, however, in the case of a CIS, the MTF value changes drastically with respect to change in the focal length.

Figure 6:
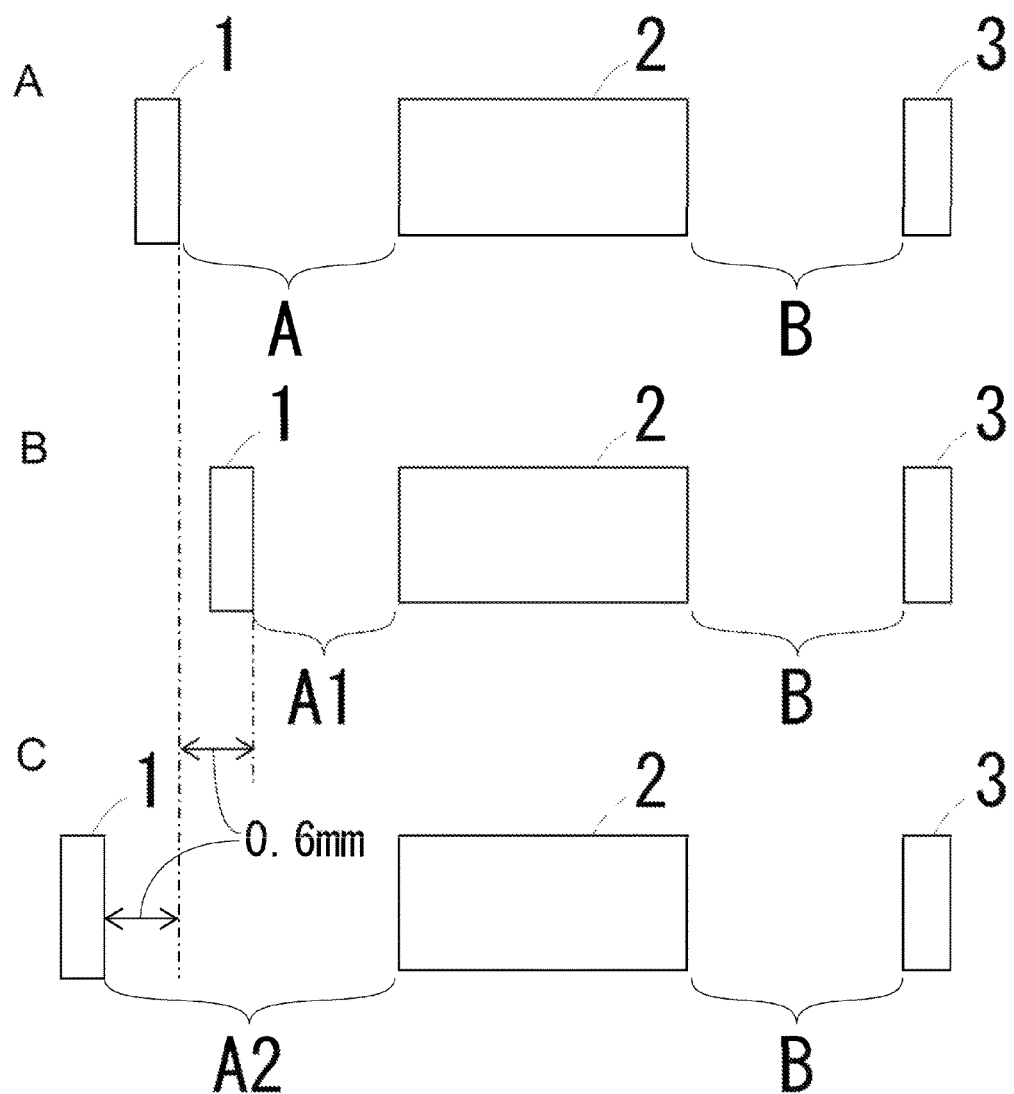
FIG. 6 is an explanatory view for explaining the focal length in a CIS.
Figure 7:
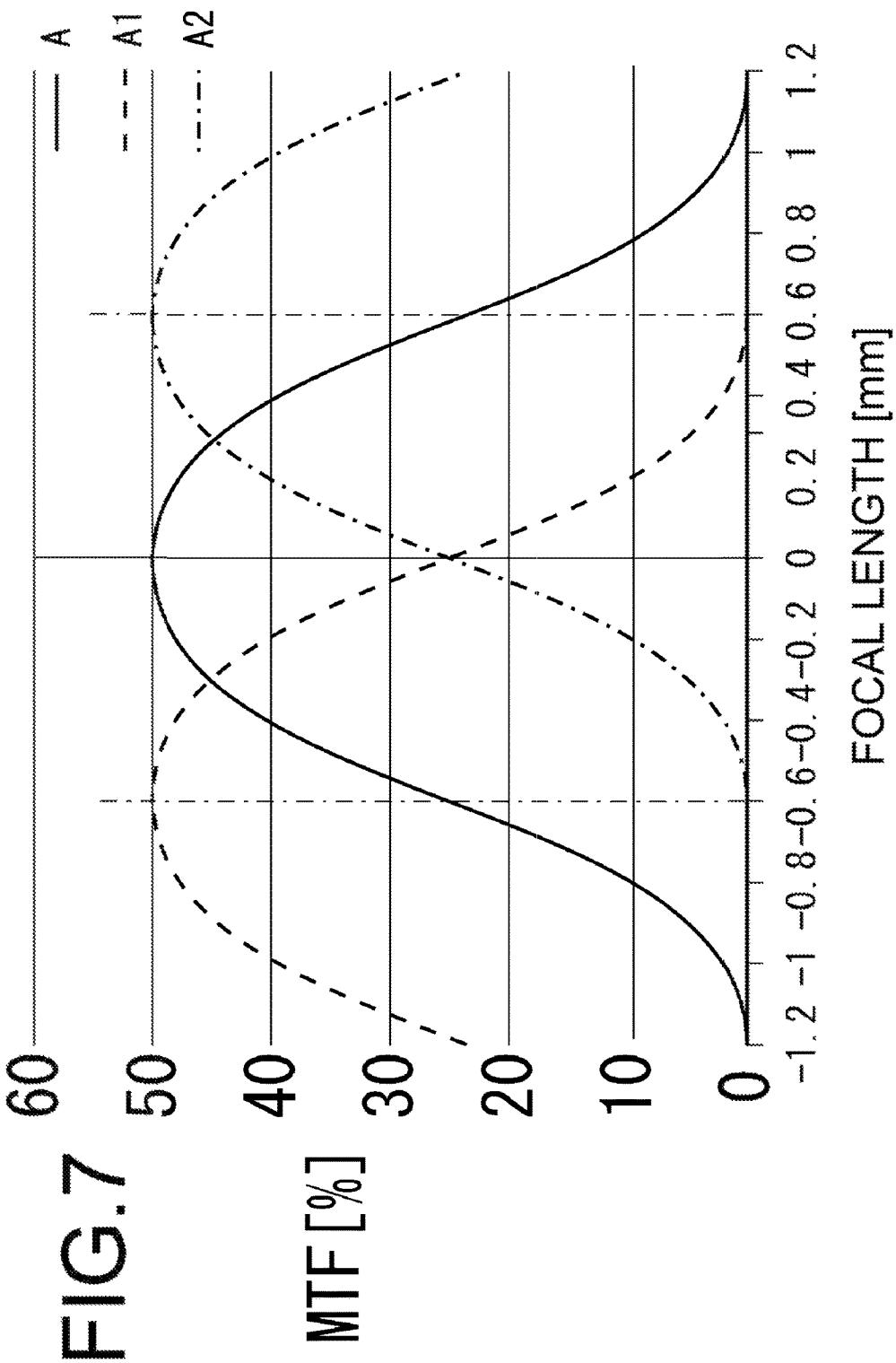
FIG. 7 is a diagram illustrating the relationship between the focal length and a MTF in a CIS.

The focal length in a CIS is set according to the positional relationship of the CMOS sensor 1, the lens 2 and the document 3 being copied as illustrated in FIG. 6. As illustrated in element A in FIG. 6, when the distance A between the CMOS sensor 1 and the lens 2 is equal to the distance between the lens 2 and the document 3, the MTF becomes a maximum at a focal length of 0 mm as illustrated in FIG. 7. However, as illustrated in element B in FIG. 6, when the distance A1 between CMOS sensor 1 and the lens 2 is 0.6 mm shorter than the distance B between the lens 2 and the document 3, the MTF becomes a maximum at a focal length of −0.6 mm, and the MTF at a focal length of 0 mm decreases as illustrated in FIG. 7. Moreover, as illustrated in element C in FIG. 6, when the distance A2 between the CMOS sensor 1 and the lens 2 is 0.6 mm longer than the distance B between the lens 2 and the document 3, the MTF becomes a maximum at a focal length of 0.6 mm, and the MTF at a focal length of 0 mm decreases as illustrated in FIG. 7.

Typically, the CIS is an assembled member, and the CMOS sensor 1 and lens 2 are installed in the housing by assembly. Therefore, the CIS is provided in a state in which the distance A between the CMOS sensor 1 and the lens 2 is fixed, however, in actuality, dimensional errors occur in installation.

Therefore, when mounting the CIS in the document reading apparatus, the MTF is measured using a test chart in which black and white lines are formed that are orthogonal with respect to the main scanning direction, and the focal length is adjusted by adjusting the distance B between the lens 2 and document 3 so that the MTF becomes a maximum.

Figure 5:
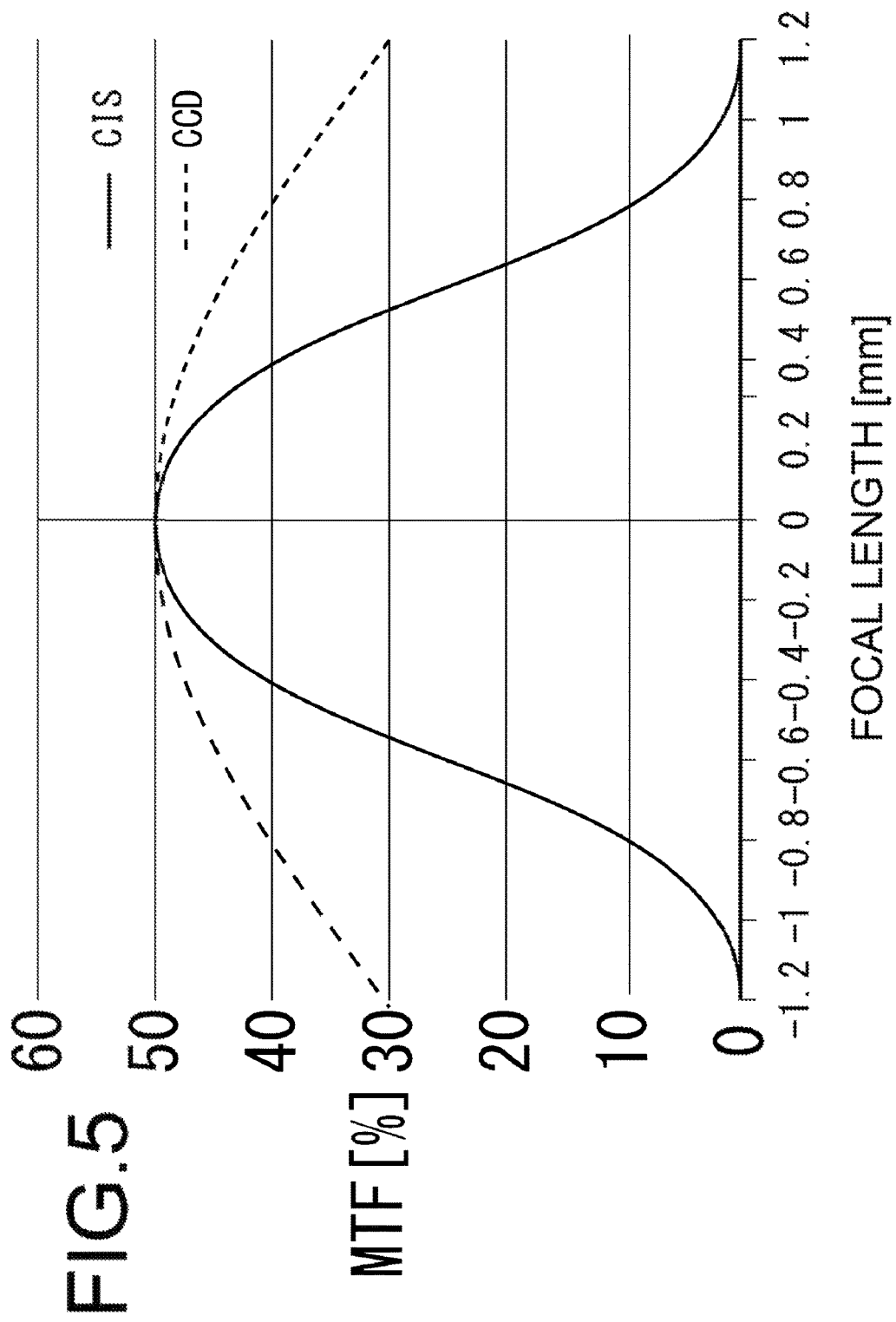
FIG. 5 is a diagram illustrating the relationship between the focal length and a MTF in a CIS and a CCD.

As illustrated n FIG. 8, the distance B between the lens 2 and the document 3 becomes the value obtained by adding the thickness Ba of the spacer 5 that sets the space between the CIS 10 (lens 2) and the contact glass 4 and the thickness Bb of the contact glass 4. Therefore, in order to measure the focal length at the maximum MTF in the CIS that is mounted in the document reading apparatus, it is necessary to individually measure an MTF curve as illustrated in FIG. 5 and install a spacer 5 having the appropriate thickness Ba.

However, the value of the MTF that can be acquired in one measurement is only one point that is set by the thickness Ba of the spacer 5 that is mounted at the time of measurement. Therefore, in order to measure the MTF curve, measurement (scanning in the sub scanning direction indicated by the arrows in FIG. 8) must be performed multiple times by changing the thickness Ba of the spacer 5, and there is a problem in that the number of measurement steps increases. Moreover, it is only possible to perform measurement in intervals between the thicknesses Ba that are changed by the spacer 5, so when the number of measurements is reduced for the purpose of reducing the number of measurement steps, it becomes difficult to measure an accurate MTF curve.

Taking into consideration the problems described above, the object of the present disclosure is to provide a MTF measuring method that is able to estimate an accurate MTF curve in one measurement.

According to the present disclosure, the MTFs at multiple depths can be measured in one measurement, which has the effect of making it possible to easily estimate an accurate MTF curve.

Incidentally, the embodiments according to the present disclosure are not limited to the embodiments described above, and it is obvious that each of the embodiments can be suitably changed within the range of the technical idea of the present disclosure. Moreover, the number, position, shape and the like of the components described above are not limited to those in the embodiments described above, the number, position, shape and the like that are suitable for implementing the technology according to the present disclosure can be used. In each of the drawings, the same reference numbers are used for the same components.

What is claimed is:

1. An MTF adjusting method performed in conjunction with measuring MTF of a contact image sensor having multiple photoelectric conversion elements that are arranged in a main scanning direction, and a lens that directs incident reflected light from a document via a contact glass to the photoelectric conversion elements, comprising the steps of:
   placing a test chart on the contact glass via a transparent plate having a thickness that varies at different locations in a sub scanning direction; and
   causing the contact image sensor to scan in the sub scanning direction, and in one scan, to measure respective MTFs at multiple measurement locations where the thickness of the transparent plate differs;
   wherein
   the space between the lens and the contact glass can be adjusted by the thickness of a spacer;
   the thickness of the spacer that is mounted at the time of measurement is set to be less than a value obtained by subtracting the thickness of the contact glass from the minimum value of the assumed distance between the photoelectric conversion elements and the lens; and
   the method further comprises
   identifying a measurement location having the highest MTF measurement result from among the multiple measurement locations method; and
   setting a value obtained by adding the thickness of the transparent plate at the identified measurement location and the thickness of the spacer that is mounted at the time of measurement as the thickness of the spacer to be mounted in a document reading apparatus.

2. The MTF adjusting method according to claim 1, wherein
   the transparent plate has a flat first surface, and a second surface that faces the first surface and that is inclined at a specified angle, and the first surface is placed on the contact glass so that the thickness of the transparent plate does not change in the main scanning direction, and gradually decreases or gradually increases in the sub scanning direction.

3. The MTF adjusting method according to claim 1, wherein
   the maximum thickness of the transparent plate among thicknesses at multiple measurement locations is set to be larger than a value that is obtained by subtracting the thickness of the spacer that is mounted at the time of measurement and the thickness of the contact glass from the maximum value of the assumed distance between the photoelectric conversion elements and the lens.

* * * * *